(12) United States Patent
Stewart et al.

(10) Patent No.: US 7,539,190 B2
(45) Date of Patent: May 26, 2009

(54) MULTICASTING IN A SHARED ADDRESS SPACE

(75) Inventors: Heath Stewart, Santa Barbara, CA (US); Michael de la Garrigue, Agoura Hills, CA (US); Chris Haywood, Thousand Oaks, CA (US); Thomas Reiner, Carlsbad, CA (US); Ken Wong, San Diego, CA (US)

(73) Assignee: Topside Research, LLC, Williamsburg, VA (US)

( * ) Notice: Subject to any disclaimer, the term of this patent is extended or adjusted under 35 U.S.C. 154(b) by 833 days.

(21) Appl. No.: 10/778,857

(22) Filed: Feb. 13, 2004

(65) Prior Publication Data

US 2005/0147114 A1 Jul. 7, 2005

Related U.S. Application Data

(60) Provisional application No. 60/534,586, filed on Jan. 5, 2004.

(51) Int. Cl.
*H04L 12/56* (2006.01)
(52) U.S. Cl. .................. 370/390; 370/428; 370/432
(58) Field of Classification Search .............. 370/390, 370/428, 432
See application file for complete search history.

(56) References Cited

U.S. PATENT DOCUMENTS

| | | | |
|---|---|---|---|
| 4,394,725 A | 7/1983 | Bienvenu | |
| 4,704,606 A | 11/1987 | Hasley | |
| 4,740,954 A | 4/1988 | Cotton | |
| 4,958,299 A | 9/1990 | Akada | |
| 5,404,461 A | 4/1995 | Olnowich | |
| 5,555,543 A | 9/1996 | Grohoski | |
| 5,610,914 A | 3/1997 | Yamada | |
| 5,617,421 A | 4/1997 | Chin | |
| 5,649,149 A | 7/1997 | Stormon | |
| 5,659,713 A | 8/1997 | Goodwin | |
| 5,784,003 A | 7/1998 | Dahlgren | |
| 5,841,874 A | 11/1998 | Kempke | |
| 5,860,085 A | 1/1999 | Stormon | |
| 5,898,689 A | 4/1999 | Kumar | |
| 5,961,626 A | 10/1999 | Harrison | |
| 5,982,749 A | 11/1999 | Daniel | |
| 6,122,674 A | 9/2000 | Olnowich | |
| 6,138,185 A * | 10/2000 | Nelson et al. ................. 710/33 |
| 6,172,980 B1 | 1/2001 | Flanders | |
| 6,188,689 B1 | 2/2001 | Katsube | |

(Continued)

OTHER PUBLICATIONS

Petaswitch Solutions, Inc., The Pisces Chipset, Product Brief, 2001, http://www.peta-switch.com/products/product_brief.htm.

(Continued)

*Primary Examiner*—Jason E Mattis
(74) *Attorney, Agent, or Firm*—SoCal IP Law Group LLP; Steven C. Sereboff; John E. Gunther

(57) ABSTRACT

There is disclosed apparatus and methods of multicasting in a shared address space. There may be defined a number of portions of the address space. There may be groups of the portions, and data units addressed to one portion within the group may be re-addressed to the other portions.

22 Claims, 3 Drawing Sheets

U.S. PATENT DOCUMENTS

| | | | |
|---|---|---|---|
| 6,301,255 | B1 | 10/2001 | Park |
| 6,346,946 | B1 | 2/2002 | Jeddeloh |
| 6,442,674 | B1 | 8/2002 | Lee |
| 6,477,623 | B2 | 11/2002 | Jeddeloh |
| 6,487,171 | B1 | 11/2002 | Honig |
| 6,493,347 | B2 | 12/2002 | Sindhu |
| 6,510,138 | B1 | 1/2003 | Pannell |
| 6,557,053 | B1 | 4/2003 | Bass |
| 6,574,194 | B1 | 6/2003 | Sun |
| 6,714,555 | B1 | 3/2004 | Excell |
| 6,882,589 | B2 * | 4/2005 | Bailey .................... 365/230.02 |
| 7,058,053 | B1 * | 6/2006 | Schober ....................... 370/390 |
| 7,340,546 | B2 * | 3/2008 | Moll et al. .................. 710/220 |
| 2001/0037435 | A1 | 11/2001 | Van Doren |
| 2002/0099855 | A1 | 7/2002 | Bass |
| 2002/0122386 | A1 | 9/2002 | Calvignac |
| 2002/0165947 | A1 | 11/2002 | Akerman |
| 2003/0088694 | A1 | 5/2003 | Patek |
| 2003/0188062 | A1 * | 10/2003 | Luse et al. .................. 710/104 |
| 2004/0030857 | A1 | 2/2004 | Krakirian |
| 2004/0230735 | A1 | 11/2004 | Moll |
| 2005/0076145 | A1 * | 4/2005 | Ben-Zvi et al. ............. 709/245 |

OTHER PUBLICATIONS

Petaswitch Solutions, Inc., PetaSwitch Soluctions Announces Raising $4 Million in First Round Financing, Press Release, 2001, http://peta-switch.com/newsroom/press_releases.htm.

Petaswitch Solutions, Inc., Company Overview, 2001, http://www.peta-switch.com/markets/overview.htm.

Gupta, Scheduling in Input Queued Switches: A Survey, Jun. 1998, Department of Computer Science, Stanford University, California.

Prabhakar, et al., Desigining a Multicast Switch Scheduler, 1995, Computer Systems Lab Technical Report, Standford University.

Schoenen, et al., Distributed Cell Scheduling Algorithms for Virtual-Output-Queued Switches, Dec. 1999, pp. 1211-1215, vol. 1, GLOBECOM, IEEE Global Telecommunications Conference.

Fahmy, A Survey of ATM Switching Techniques, Aug. 14, 2001, Department of Computer and Information Science, The Ohio State University.

Klein, PCI Express is the new I/O Solution of Choice, Article, Nov. 2004, pp. 1-5, Technology @ Intel Magazine, Intel Corporation.

Bhatt, Creating a Third Generation I/O Interconnect, White Paper, 2002, pp. 1-8, Technology and Research Labs, Intel Corporation, http://www.Intel.com/technology/pciexpress/downloads/3rdgenwhitepaper.pdf.

Stam, Inside PCI Express, Article, Sep. 9, 2002, pp. 1-37, ExtremeTech, http://www.extremetech.com/article2/0,3973,522663,00.asp.

Intel, Improve Video Quality with the PCI Express x16 Graphics Interface, Sales Brief, 2004, pp. 1-2, Intel Corporation, http://www.intel.com/design/chipsets/pciexpress.pdf.

Memory-mapped I/O, Wikipedia, available at http://en.wikipedia.org/wiki/Memory-mapped_I/O, accessed Aug. 12, 2008.

Memory-mapped I/O, Javvin on-line Glossary and Dictionary of Computer Hardware Terms, available at http://www.javvin.com/hardware/MemoryMappedIO.html, accessed Aug. 12, 2008.

* cited by examiner

MULTICASTING IN A SHARED ADDRESS SPACE

RELATED APPLICATION INFORMATION

This patent is a continuation-in-part of Application No. 60/534,586 filed Jan. 5, 2004 and entitled "PCI Express Switch with Broadcast and/or Multicast Capability."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to multicasting in a shared address space.

2. Description of the Related Art

The Peripheral Component Interconnect ("PCI") standard was promulgated about ten years ago, and has since been updated a number of times. One update led to the PCI/X standard, and another, more recently, to PCI Express. The PCI standards are defined for chip-level interconnects, adapter cards and device drivers. The PCI standards are considered cost-effective, backwards compatible, scalable and forward-thinking.

PCI buses, whether they be PCI Express or previous PCI generations, provide an electrical, physical and logical interconnection for multiple peripheral components of microprocessor based systems. PCI Express systems differ substantially from their PCI and PCI/X predecessors in that all communication in the system is performed point-to-point. Unlike PCI/X systems in which two or more end points share the same electrical interface, PCI Express buses connect a maximum of two end points, one on each end of the bus. If a PCI Express bus must communicate with more than one end point, a switch, also known as a fan out device, is required to convert the single PCI Express source to multiple sources.

The communication protocol in a PCI Express system is identical to legacy PCI/X systems from the host software perspective. In all PCI systems, each end point is assigned one or more memory and IO address ranges. Each end point is also assigned a bus/device/function number to uniquely identify it from other end points in the system. With these parameters set a system host can communicate with all end points in the system. In fact, all end points can communicate with all other end points within a system. However, communication in PCI Express is limited to two end points, a source and a destination, at a time.

The PCI Express standard specifies one limited form of broadcasting. That is, if the transaction is a TLP type Message (Msg) denoted by a Format and Type field of 0110011, the transaction is broadcast from the Root Complex to all end points. This broadcast is for system management and configuration and is not applicable to data transport transactions.

DETAILED DESCRIPTION OF THE INVENTION

Throughout this description, the embodiments and examples shown should be considered as exemplars, rather than limitations on the apparatus and methods of the present invention.

Description of Systems

Figure 1:
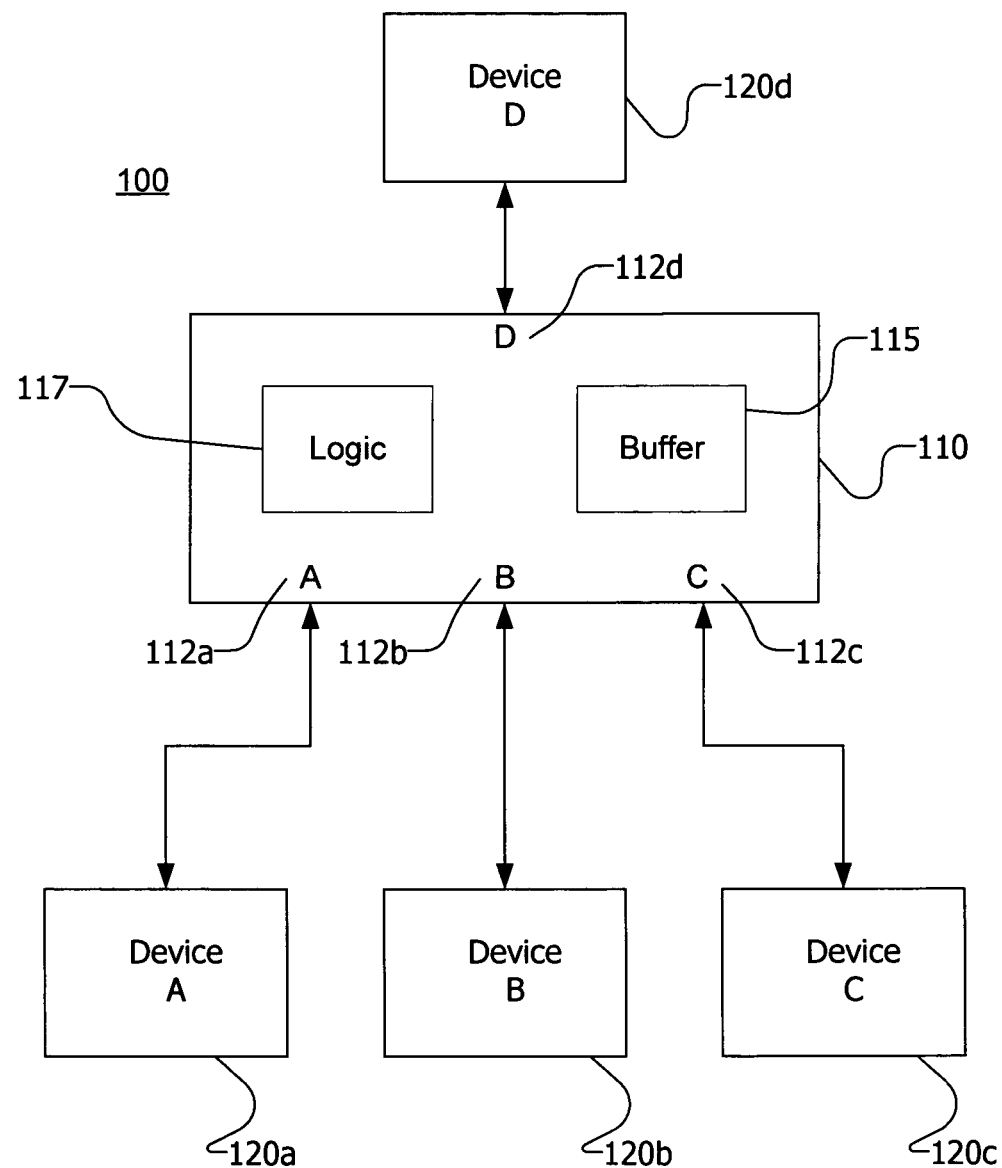
FIG. 1 is a block diagram of a switching environment.

Referring now to FIG. 1, there is shown a block diagram of a switching environment 100. The switching environment includes a switch 110, a number of end points 120a, 120b, 120c, 120d. The switching environment 100 may be a point-to-point communications network.

The term "switch" as used herein means a system element that connects two or more ports to allow data units to be routed from one port to another, and the switch 110 is a switch. The switch 110 includes a number of ports 112a, 112b, 112c, 112d, which are logical interfaces between the switch 110 and the end points 120. The switch 110 further includes a buffer 115 and logic 117.

By data unit, it is meant a frame, cell, datagram, packet or other unit of information. In some embodiments, such as PCI, a data unit is unencapsulated. Data units may be stored in the buffer 115. By buffer, it is meant a dedicated or shared memory, a group or pipeline of registers, and/or other storage device or group of storage devices which can store data temporarily. The buffer 115 may operate at a speed commensurate with the communication speed of the switching environment 100. For example, it may be desirable to provide a dedicated memory for individual portions (as described below) and pipelined registers for multicast portions (as described below).

The logic 117 includes software and/or hardware for providing functionality and features described herein. The logic 117 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the logic 117 may include various specialized units, circuits, software and interfaces for providing the functionality and features described herein. The invention may be embodied in whole or in part in software which operates in the switch 110 and may be in the form of firmware, an application program, an applet (e.g., a Java applet), a browser plug-in, a COM object, a dynamic linked library (DLL), a script, one or more subroutines, or an operating system component or service. The hardware and software of the invention and its functions may be distributed such that some components are performed by the switch 110 and others by other devices.

The end points 120a, 120b, 120c, 120d are logical devices which connect to and communicate with the switch 110 respectively through the ports 112. The end points 120a, 120b, 120c, 120d may share an address space, such as a memory address space or an I/O address space. The term "address space" means the total range of addressable locations. If the shared address space is a memory address space, then data units are transmitted via memory mapped I/O to a destination address into the shared memory address space.

Figure 2:
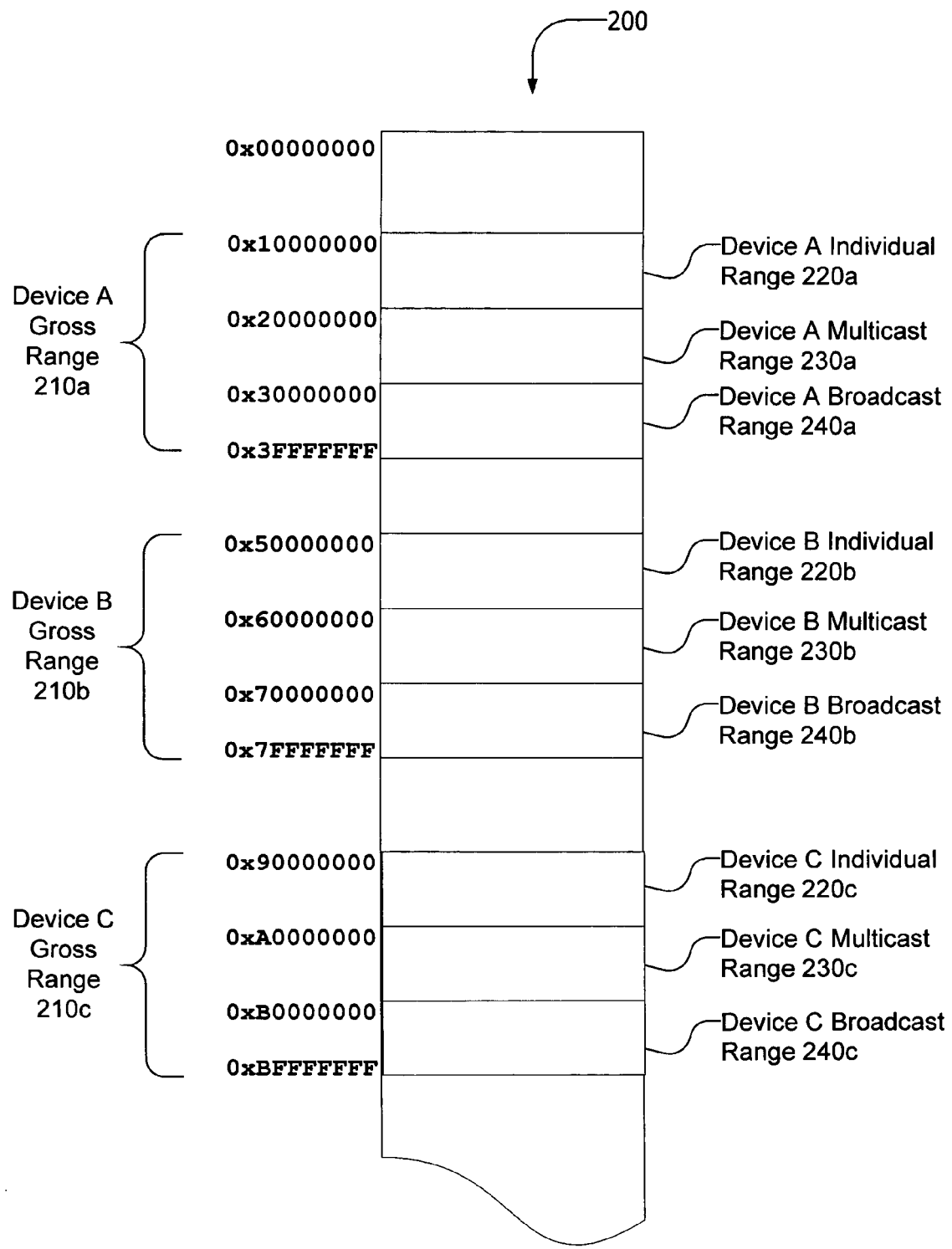
FIG. 2 is a diagram of a shared address space.

Referring now to FIG. 2, there is shown a diagram of a shared address space 200. The shared address space 200 shows contiguous ranges, but the address spaces associated with the end points 120 may be non-contiguous and the term "portions" is meant to refer to contiguous and non-contiguous spaces. Data units may be written into or communicated into an address portion. Address portions must therefore be large enough to accommodate at least one data unit. For at least these reasons, a single point or address within an address space cannot be a portion. An address portion must occupy at least two slots within the address space, and in most embodiments will have a sizable number of slots specified as a range. In a switch conforming to the PCI Express standard, it is expected that the address portions in a 32-bit shared memory address space or shared I/O address space will be at least as large as the largest expected transaction, and comparable to those shown in FIG. 2.

Within the shared address space 200, there is a gross address portion 210a associated with end point A 120a. Within the gross address portion 210a, there is an individual portion 220a, a multicast portion 230a and a broadcast portion 240a. Likewise, end point B 120b may have a gross address portion 210b with an individual portion 220b, a multicast portion 230b and a broadcast portion 240b. Likewise, end point C 120c may have a gross address portion 210c with an individual portion 220c, a multicast portion 230c and a broadcast portion 240c. A gross address portion, an individual portion, a multicast portion and a broadcast portion may be associated with end point D 120d.

The address space 200 may be allocated so as to provide the end points 120 with unique gross address portions. The individual portions may be unique within the shared address space with respect to one another, as may be the multicast portions and the broadcast portions.

The address portions (gross, individual, multicast and broadcast) may have various characteristics. The address portions may have respective sizes. The sizes may be fixed or variable. The address portions may be defined by a base address, as well as by a size or end address. The address portions may come to be associated with the end points 120 through an arbitrage process, through centralized assignment (e.g., by a host or the switch 110), otherwise or through a combination of these. The group portion, the individual portion, the multicast portion and the broadcast portion for a given end point 120 need not be contiguous. To avoid errors, it may be desirable if the individual portions, the multicast portions and the broadcast portions do not overlap.

Data units may be directed to one or more of the end points 120 by addressing. That is, a destination address is associated with and may be included in the data units. The destination address determines which end point 120 should receive a given data unit. Thus, data units addressed to the individual portion for a given end point 120 should be received only by that end point 120. Depending on the embodiment, the destination address may be the same as the base address or may be within the address portion.

Multicasting presents a somewhat more complex and flexible case than single-casting. To allow for multicasting to a group of selected end points, a multicast group is defined. Within the multicast group, the multicast portions of the selected end points are associated, and logic is provided which causes data units sent to the multicast portion of one end point in the multicast group to be sent to the multicast portions of the other end points in the multicast group. The data units addressed to the multicast portion for a given end point 120 should be received by all of the end points in the same multicast group. Alternatively, within a multicast group, one of the multicast portions may be selected as a "master" and the other multicast portions treated as ghosts. Accordingly, data units addressed to the master may be multicast to the group, but data units addressed to a ghost may be single-cast to the slave or treated as exceptions.

A given end point 120 may belong to multiple multicast groups and therefore have multiple multicast portions. For example, end point A 120a may be in a first multicast group with end point B 120b, in a second multicast group with end point C 120c, and a third multicast group with end point B 120b and end point C 120c. In this example, end point A might have three multicast portions. The various multicast groups may also be grouped, to provide super-groupings. For example, there might be a first multicast group having end point A 120a and end point B 120b; a second multicast group having end point A 120a and end point C 120c; and a third multicast group having the first multicast group and the second multicast group, i.e., end point A 120a, end point B 120b and end point C 120c.

It can be seen that single-casting and broadcasting are special cases of multicasting. In single-casting, the multicast group includes only one end point, and has only the one end point's individual portion. In contrast, in broadcasting, the multicast group includes all end points, and has the broadcast portions for all end points. In one alternative, there is a single broadcast portion, and logic is provided which causes data units which are sent to the broadcast portion to be sent to the individual portions of all end points 120.

Each multicast portion may be unique. Alternatively, there may be a single multicast portion for all of the end points 120 in a multicast group. An alternate way to support multicast would be to define multiple sub-portions within a master broadcast portion, each with its own vector defining which ports are to participate in the multicast transactions. Each sub-portion would define a multicast group and the associated vector would contain an enable bit for each port on the switch. If the enable bit for a port is set then the transaction is forwarded to that port. Any number of multicast portions could be defined by this mechanism.

The multicasting portions in a group may have nearly identical base addresses, and only differ from each other from a single or small number of bits or digits. The sizes of the individual portions for the various end points 120 may differ. In contrast, the multicasting portions in a multicast group may have substantially equal or equal sizes. Having such equal-sized multicast portions may ensure communication integrity and efficient use of the shared address space 300.

The end points 120 may be associated with respective ports 112. Through this association, a given end point 120 may send data units to and receive data units from its associated port 112. This association may be on a one-to-one basis. Because of these relationships, the ports 112 also have associations with the address portions of the end points 120. Thus, the ports 112 may be said to have address portions (including respective individual portions, multicast portions and broadcast portions) within the address space 200.

Description of Methods

Figure 3:
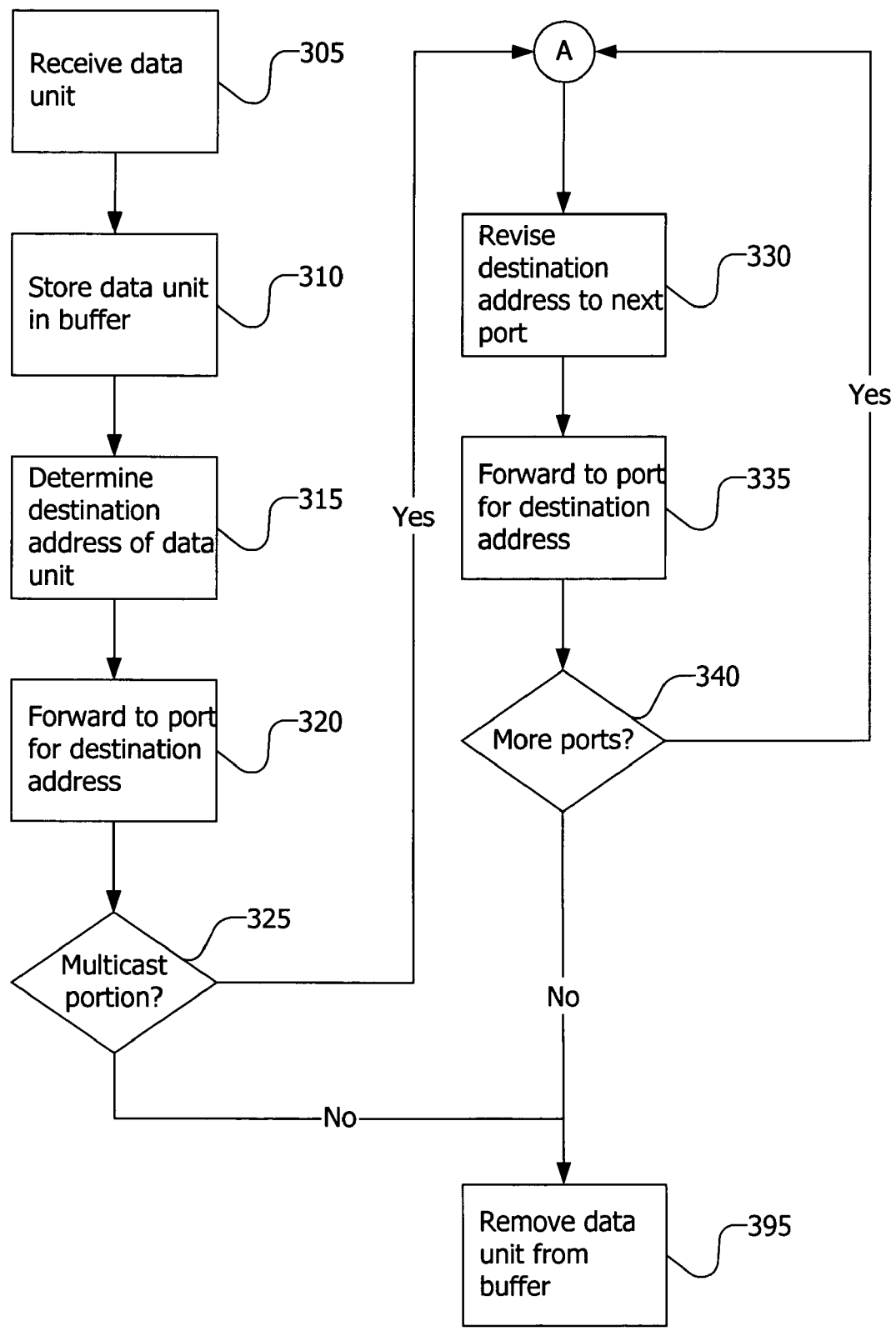
FIG. 3 is a flow chart of a method of multicasting in a shared address space.

Referring now to FIG. 3, there is shown a flow chart of a method of multicasting in a shared address space. The switch 110 may receive a data unit, e.g., through port D 120d (step 305). The logic 117 causes the received data unit to be stored in the buffer 115 (step 310). The data unit may be stored in whole or in part in the buffer 115. For example, in streaming applications, it may be desirable to store a header in the buffer but switch the payload directly from the ingress port to the egress port in a cut-through manner. The logic 117 also determines the destination address of the data unit and selects the port 120 associated with the destination address (step 315). Step 315 may be performed, for example, using a lookup table, or through hard wiring addresses to ports. Next, the logic 117 forwards the data unit for transmission out the selected port 120 (step 320).

If the destination address is in the individual portion associated with one of the ports (step 325), then the logic 117 causes or allows the data unit to be removed from the buffer 115 (step 395).

If the destination address is in the multicast portion associated with one of the ports (step 325), then step 395 is deferred. Instead, the data unit is forwarded for transmission out the other ports in the same group as the multicast portion encompassing the destination address. This may be achieved by replacing the destination address of the data unit with that of another (e.g., the next) multicast portion in the same group (step 330), and then forwarding the data unit for transmission out the port associated with the (revised) destination address (step 335). If there is more than one port in the multicast group (step 340), steps 330 and 335 may be continued until the data unit has been forwarded for transmission out all of the ports in the group. Then, the data unit may be removed from the buffer 115 (step 395).

The replacing step 330 may be performed in a number of ways. For example, the destination address may be revised by drawing addresses from a table of multicast portions. Alternatively, the multicast portions in a multicast group may differ from one another according to a rule, and the rule used to determine the next destination address. For example, as shown in FIG. 2, the multicast portions may be contiguous blocks of 0x10000000 spaced apart by 0x40000000.

Broadcasting may be handled similarly to multicasting. Thus, if a data unit has a destination address in the broadcast portion for a port, then the data unit is forwarded for transmission out the port, the destination address is revised as in step 330 and the data unit is forwarded as in step 335. This may be continued until the data unit has been forwarded for transmission out all of the ports.

The use of shared memory space as described may be considered as providing "real" ports which are associated with the individual portions, and "virtual" ports which are associated with the multicast portions and broadcast portions. The virtual ports may be mapped to the real ports. Thus, data units may be multicast simply by selecting an appropriate address, and neither the format of the data units nor the content of the data units need be changed to accommodate multicasting. Intelligence in the switch recognizes that an address is a multicast address, and replicates and re-maps the address of the data units to the other ports in the multicast group.

Although broadcast has been treated as a special case of multicast, the converse is also possible. According to one alternative, broadcast support is enabled and ports outside of the multicast group are disabled. This could be done ahead of each multicast data unit. For example, to send a data unit from end point D 120d to both end point A 120a and end point C 120c, end point D 110d could send an instruction to the switch 110 to enable broadcast, but disable port B 112b. End point D 120d would then send the data unit which the switch 110 would route to port A 112a and port C 112c.

With regard to FIG. 2, additional and fewer steps may be taken, and the steps as shown may be combined or further refined to achieve the methods described herein.

There may be anticipated and unanticipated conditions in which one or more of the ports 112 is removed or otherwise becomes unavailable, either in a controlled or uncontrolled manner. To maintain desirable data flow, the logic 117 may include a capability to resolve these types of port exceptions. If a port becomes unavailable, for example, the logic 117 may ignore or discard those data units addressed to the individual portion, the multicast portion and/or the broadcast portion for that port. The logic 117 may multicast portion or a broadcast portion for an unavailable port, the logic may skip the unavailable port and continue the multicast or broadcast to other ports. Alternatively, the logic 117 may discontinue the multicast or broadcast altogether. The logic 117 may report the port exceptions and its response to the source of the data units and/or to other destinations.

The invention may be used to advantage in PCI Express switches and devices. For example, PCI Express-compliant video graphics systems and communications data backplanes may benefit from the invention. It is believed that the invention is compatible with the PCI Express memory write request transaction. The invention may be compatible with other PCI Express transaction types and other standards.

The PCI Express standard provides for confirmation messages in some situations, which the standard refers to as non-posted transactions. The system and methods described herein are compatible with both posted and non-posted transactions, though it may be desirable to consolidate or otherwise dispose of confirmation messages responsive to multicast and broadcast data units.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. A method of multicasting data units having destination addresses in a shared memory address space, comprising:
   dividing the shared memory address space into a plurality of portions, wherein respective individual portions of the shared memory address space are associated with each of a plurality of ports of a switch, respective multicast portions are associated with at least some of the ports, and wherein the multicast portions have associations with one other
   the method further comprising, for a given data unit:
      if the destination address is in an individual portion associated with one of the ports, then forwarding the data unit for transmission out the associated port
      if the destination address is in a first multicast portion associated with one of the ports, then
         forwarding the data unit for transmission out the port associated with the first multicast portion
         forwarding the data unit for transmission out a port associated with a second multicast portion associated with the first multicast portion, wherein the forwarded data unit is revised to specify a destination address within the second multicast portion,
   transmitting data units through at least some of the ports via memory-mapped I/O into the shared memory address space.

2. The method of multicasting of claim 1 wherein the individual portions are unique within the shared memory address space with respect to one another.

3. The method of multicasting of claim 1 wherein the multicast portions are unique within the shared memory address space with respect to one another.

4. A switch for multicasting in a shared memory address space, the switch comprising
   a buffer for storing data units, the data units having destination addresses in the shared memory address space a first port associated with a first address portion in the shared memory address space, the first address portion including a first multicast address portion a second port associated with a second address portion in the shared memory address space, the second address portion including a second multicast address portion associated with the first multicast address portion logic to cause data units in the buffer having a destination address in the first multicast address portion to be forwarded for transmission out the first port without being removed from the buffer and then replace the destination address with an address in the second multicast address portion cause data units in the buffer having a destination address in the second address portion to be forwarded for transmission out the second port, wherein the switch has logic to transmit data units through the first port and the second port via memory-mapped I/O into the shared memory address space.

5. The switch for multicasting in a shared memory address space of claim 4 wherein the first address portion has a first size the second address portion has a second size the second size is equal to the first size.

6. The switch for multicasting in a shared memory address space of claim 4 wherein the first address portion has a first base address the second address portion has a second base address the first base address and the second base address differ by only a single digit.

7. The switch for multicasting in a shared memory address space of claim 4 having at least three ports, wherein the logic supports all of the ports having the characteristics defined for the first port.

8. The switch for multicasting in a shared memory address space of claim 4 wherein the logic is further to cause data units in the buffer having a destination address in the second portion to be forwarded for transmission out the second port and be removed from the buffer.

9. The switch for multicasting in a shared memory address space of claim 4 wherein the first address portion includes a first individual address portion wherein the second address portion includes a second individual address portion wherein the logic is further to cause data units in the buffer having a destination address in the first individual address portion to be forwarded for transmission out the first port and be removed from the buffer cause data units in the buffer having a destination address in the second individual address portion to be forwarded for transmission out the second port and be removed from the buffer.

10. The switch for multicasting in a shared memory address space of claim 9 wherein the first individual address portion comprises only a portion of the first address portion in the shared memory address space assigned to the first port.

11. A switch for multicasting in a shared memory address space, the switch comprising a buffer logic to store data units into the buffer a first port associated with a first address portion in the shared memory address space, the first address portion including an individual portion and a multicast portion a second port associated with a second address portion in the shared memory address space including an individual portion and a multicast portion logic to cause data units in the buffer having a destination address in the individual portion of the first address portion to be forwarded for transmission out the first port and be removed from the buffer cause data units in the buffer having a destination address in the individual portion of the second portion to be forwarded for transmission out the second port and be removed from the buffer cause data units in the buffer having a destination address in the multicast portion of the first address portion to be forwarded for transmission out the first port without being removed from the buffer and then replace the destination address with an address in the multicast portion of the second address portion cause data units in the buffer having a destination address in the multicast portion of the second portion to be forwarded for transmission out the second port, wherein the switch has logic to transmit data units through the first port and the second port via memory-mapped I/O into the shared memory address space.

12. The switch for multicasting in a shared memory address space of claim 11 further comprising a third port associated with a third address portion in the shared memory address space including an individual portion and a multicast portion logic to cause data units in the buffer having a destination address in the individual portion of the third address portion to be forwarded for transmission out the third port and be removed from the buffer replace the destination address of data units in the buffer having a destination address in the multicast portion of the second address portion with an address in the multicast portion of the third address portion cause data units in the buffer having a destination address in the multicast portion of the third portion to be forwarded for transmission out the third port.

13. The switch for multicasting in a shared memory address space of claim 11 wherein the multicast portion of the first address portion has a first size the multicast portion of the second address portion has a second size the second size is equal to the first size.

14. The switch for multicasting in a shared memory address space of claim 11 wherein the multicast portion of the first address portion has a first base address the multicast portion of the second address portion has a second base address the first base address and the second base address differ by only a single digit.

15. The switch for multicasting in a shared memory address space of claim 11 having at least three ports, wherein the logic supports all of the ports having the characteristics defined for the first port.

16. The switch for multicasting in a shared memory address space of claim 11 wherein the logic is further to cause data units in the buffer having a destination address in the multicast portion of the second address portion to be forwarded for transmission out the second port and be removed from the buffer.

17. The switch for multicasting in a shared memory address space of claim 11, wherein the first address portion includes a broadcast portion, and the second address portion includes a broadcast portion, the switch further comprising a third port associated with a third address portion in the shared memory address space including an individual portion, a multicast portion and a broadcast portion logic to cause data units in the buffer having a destination address in the individual portion of the third address portion to be forwarded for transmission out the third port and be removed from the buffer cause data units in the buffer having a destination address in the broadcast portion of the first address portion, the second address portion or the third address portion to be forwarded for transmission out the first port, the second port and the third port with the destination address set to an address in the broadcast portion of the respective address portion for the respective port.

18. A method of multicasting in a shared memory address space using a switch having a buffer, a first port and a second port, the method comprising associating a first address portion in the shared memory address space with the first port, the first address portion including an individual portion and a multicast portion associating a second address portion in the shared memory address space with the second port, the second address portion including an individual portion and a multicast portion storing data units in the buffer, the data units including a destination address in the shared memory address space if a data unit in the buffer has a destination address in the individual portion of the first address portion, then
forwarding the data unit for transmission out the first port
removing the data unit from the buffer if a data unit in the buffer has a destination address in the multicast portion of the first address portion, then
forwarding the data unit for transmission out the first port
replacing the destination address of the data unit with an address in the multicast portion of the second address portion
forwarding the data unit for transmission out the second port
removing the data unit from the buffer if a data unit in the buffer has a destination address in the individual portion of the second address portion, then
forwarding the data unit for transmission out the second port
removing the data unit from the buffer transmitting data units through the first port via memory-mapped I/O into the shared memory address space transmitting data units through the second port via memory-mapped I/O into the shared memory address space.

19. The method of multicasting in a shared memory address space of claim 18 wherein
the multicast portion of the first address portion has a first size
the multicast portion of the second address portion has a second size
the second size is equal to the first size.

20. The method of multicasting in a shared memory address space of claim 18, wherein there is a third port, the method further comprising providing characteristics defined for the first port for the second port and the third port.

21. The method of multicasting in a shared memory address space of claim 18 further comprising, if a data unit in the buffer has a destination address in the individual portion of the second address portion, then
forwarding the data unit for transmission out the second port
removing the data unit from the buffer.

22. The method of multicasting in a shared memory address space of claim 18, wherein the first address portion includes a broadcast portion and the second address portion includes a broadcast portion, the method further comprising
associating a third address portion in the shared memory address space with a third port, the third address portion including an individual portion, a multicast portion and a broadcast portion
if a data unit in the buffer has a destination address in the individual portion of the third address portion, then
forwarding the data unit for transmission out the third port
removing the data unit from the buffer
if a data unit in the buffer has a destination address in the broadcast portion of the first address portion, the second address portion or the third address portion, then
forwarding the data unit for transmission out the first port, the second port and the third port with the destination address set to an address in the broadcast portion of the respective address portion for the respective port
removing the data unit from the buffer.

* * * * *